United States Patent
Scheerer et al.

(10) Patent No.: US 9,547,537 B2
(45) Date of Patent: Jan. 17, 2017

(54) AUTOMATIC PROFILING REPORT GENERATION

(71) Applicants: Johannes Scheerer, Heidelberg (DE); Ralf Schmelter, Wiesloch (DE); Steffen Schreiber, Frankenthal (DE); Dietrich Mostowoj, Ludwigshafen am Rhein (DE); Thomas Klink, Moerlenbach (DE); Matthias Braun, Illingen (DE)

(72) Inventors: Johannes Scheerer, Heidelberg (DE); Ralf Schmelter, Wiesloch (DE); Steffen Schreiber, Frankenthal (DE); Dietrich Mostowoj, Ludwigshafen am Rhein (DE); Thomas Klink, Moerlenbach (DE); Matthias Braun, Illingen (DE)

(73) Assignee: SAP SE, Walldorf (DE)

( * ) Notice: Subject to any disclaimer, the term of this patent is extended or adjusted under 35 U.S.C. 154(b) by 146 days.

(21) Appl. No.: 14/528,151

(22) Filed: Oct. 30, 2014

(65) Prior Publication Data
US 2016/0124780 A1    May 5, 2016

(51) Int. Cl.
| | | |
|---|---|---|
| *G06F 3/00* | (2006.01) | |
| *G06F 9/44* | (2006.01) | |
| *G06F 9/46* | (2006.01) | |
| *G06F 13/00* | (2006.01) | |
| *G06F 9/54* | (2006.01) | |
| *G06F 9/455* | (2006.01) | |
| *G06F 11/34* | (2006.01) | |

(52) U.S. Cl.
CPC .......... *G06F 9/546* (2013.01); *G06F 9/45533* (2013.01); *G06F 9/45558* (2013.01); *G06F 11/34* (2013.01); *G06F 2009/45591* (2013.01)

(58) Field of Classification Search
CPC ........................................................ G06F 9/54
USPC ........................................................ 719/328
See application file for complete search history.

(56) References Cited

U.S. PATENT DOCUMENTS

| | | | | |
|---|---|---|---|---|
| 6,587,969 | B1 * | 7/2003 | Weinberg ............ | G06F 11/3688 714/38.13 |
| 2009/0199160 | A1 * | 8/2009 | Vaitheeswaran .... | G06F 11/3414 717/124 |
| 2011/0138366 | A1 * | 6/2011 | Wintergerst ........ | G06F 11/3409 717/130 |

* cited by examiner

*Primary Examiner* — Timothy A Mudrick
(74) *Attorney, Agent, or Firm* — Schwegman Lundberg & Woessner, P.A.

(57) ABSTRACT

A method for profiling an application on a virtual machine is provided. A series of analysis steps to be performed on profiled data can be created. The series of analysis steps can be saved as a report specification. A back-end profiler can then be caused to perform profiling on the application. Profiled data can be received from the back-end profiler. The profiled data can be stored as a model. The model can then be adapted based on the series of analysis steps from the report specification. Output data can be generated based on the adapted model. Finally, the output data is displayed to a user.

20 Claims, 10 Drawing Sheets

TOP CONSUMERS 400

| | Class | Bytes | Objects |
|---|---|---|---|
| ●[ ] | char[ ] | 40.4 MB | 264,292 |
| ⊙ | java.lang.String | 12.0 MB | 315,227 |
| ⊙[ ] | java.util.HashMap$Entry[ ] | 8.88 MB | 50,047 |
| ⊙[ ] | java.lang.Object[ ] | 7.79 MB | 100,222 |
| ●[ ] | byte[ ] | 7.02 MB | 18,284 |
| ⊙ | com.sap.engine.services.deploy.ReferenceObject | 4.66 MB | 67,816 |
| ⊙ | java.util.HashMap$Entry | 4.42 MB | 96,569 |
| ⊙ | java.util.AbstractList$Itr | 3.48 MB | 91,220 |
| ⊙ | java.util.HashMap | 2.81 MB | 45,995 |
| ⊙[ ] | java.io.Serializable[ ] | 2.10 MB | 39,916 |

AUTOMATIC PROFILING REPORT GENERATION

TECHNICAL FIELD

This document generally relates to virtual machines. More specifically, this document relates to the automatic generation of a profiling report for a virtual machine.

BACKGROUND

The success of applications is not only determined by functional correctness, but also by several non-functional requirements. One of the most important non-functional aspects is performance. Profiling of a virtual machine (VM) helps to analyze the resource consumption of an application or applications running on a VM. Profiling can be useful for a number of reasons, such as identifying performance bottlenecks, exhaustive memory usage, or poor synchronization.

Profiling typically involves an adapted configuration setup of the application, such as by applying command line arguments, starting other processes, or instrumenting an executable. The scenario to be profiled is then executed while the profiling backend monitors the execution. State of the art profiling techniques allow users to drill down during a manual analysis of the profiling data using a profiling frontend. Sometimes profiling experts (people who specialize in analyzing profiled data) are used to reduce the time of the analysis for the user, but the necessity of human interaction limits the use of profiling in highly distributed systems with lots of application nodes.

BRIEF DESCRIPTION OF DRAWINGS

The present disclosure is illustrated by way of example and not limitation in the figures of the accompanying drawings, in which like references indicate similar elements and in which:

FIG. 4 is an example of a report generated by an automatic profiling report generation tool from the above report definition, in accordance with an example embodiment.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques have not been shown in detail.

In an example embodiment, a profiling report is automatically generated utilizing a predefined scheme of analysis steps designed to accurately and quickly profile and analyze huge system landscapes while still being able to focus on the application nodes that actually need attention.

As discussed briefly in the background section, manual human interaction is of limited use for profiling highly distributed applications, such as a cloud application utilizing hundreds of application nodes. In order to figure out the root cause of a performance problem in such a system, all application nodes are profiled, and then the user manually drills down into the profiling data of each application node. Even though experts may be able to speed up the manual process, this solution does not scale well. In the presence of very distributed applications, another solution is needed.

In an example embodiment, an automatic profiling report generation tool is provided that allows the user to specify a set of analysis steps that can be executed automatically given a set of profiling data. The result of the analysis steps can be text output, a graphical report, or any other indication of the existence or absence of performance bottlenecks.

Figure 1:
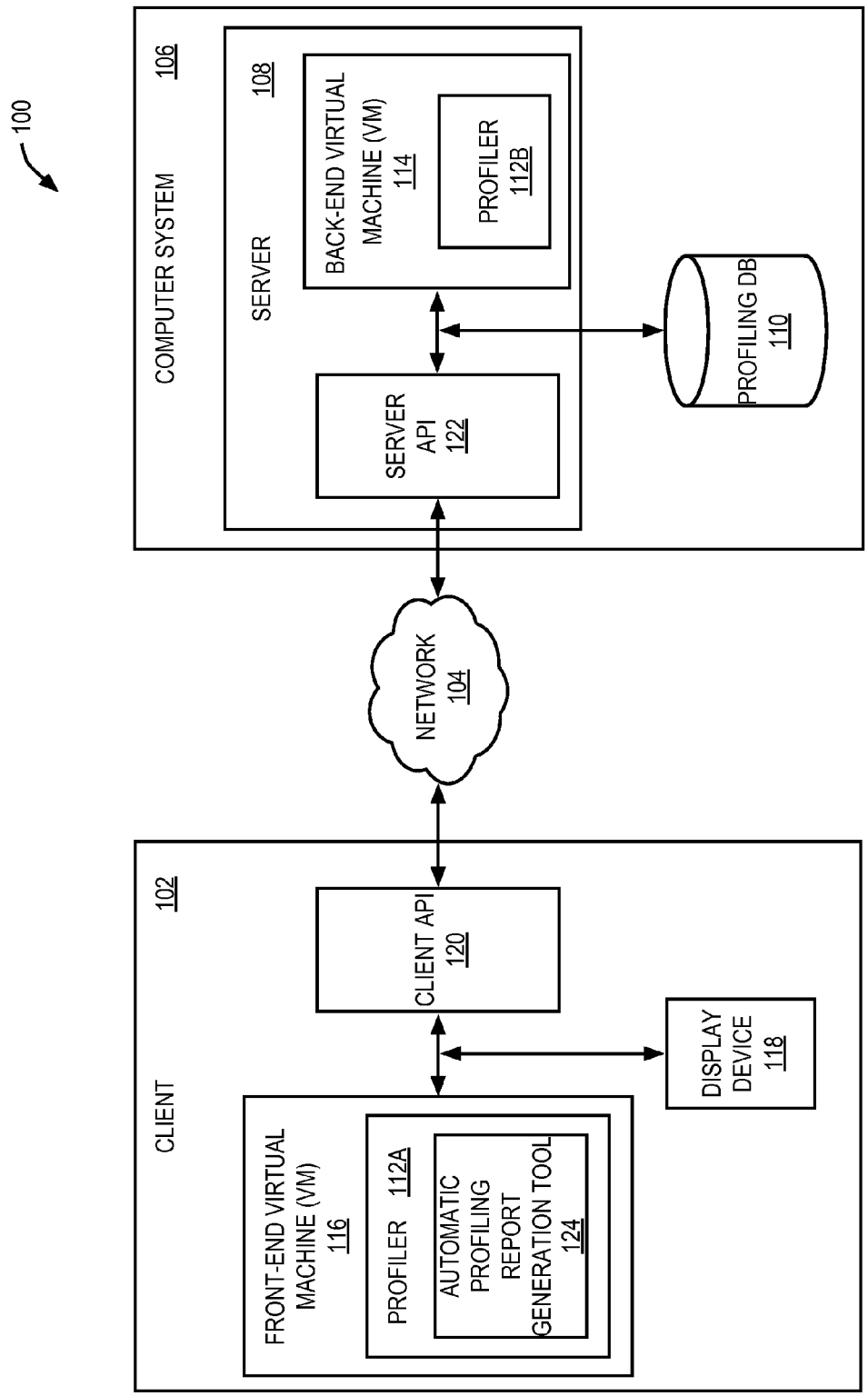
FIG. 1 is a block diagram illustrating a system that includes a virtual machine profiler, in accordance with an example embodiment.

FIG. 1 is a block diagram illustrating a system that includes a virtual machine profiler, in accordance with an example embodiment. The system 100 may be implemented as a client/server system. The system 100 may include a client 102, network 104, and computer system 106 that includes a server 108 and a profiling database 110.

In some example embodiments, the application being profiled may be an application running on a virtual machine. In some example embodiments, the virtual machine is a Java virtual machine, and in some example embodiments the application may be a standalone Java application. In other implementations, the application may be a complex enterprise application that can utilize a plurality of resources.

The profiler may include two components: a profiler front-end component (front-end profiler 112A) and a profiler back-end component (back-end profiler 112B). The back-end profiler 112B may be integrated into a back-end virtual machine 114. In some example embodiments, a native application may be provided as a front-end, with the native application understanding the profiling protocol of the back-end. In some example embodiments, the front-end profiler 112A may be integrated into a front end VM 116. For example, the back-end VM and the front-end VM can each be a Java VM (JVM), with the JVM running one or more applications integrated with the back-end profiler 112B in the back-end VM 114 and providing for connection to the front-end profiler 112A. The back-end profiler 112B can provide profiling data for one or more applications running on the back-end VM 114. The front-end profiler 112A can provide a visual representation of the profiling data provided by the back-end profiler 112B (for example, display device 118 can be used to display the profiling data to a user in a graphical user interface (GUI)).

For example, in an embodiment, a back-end profiler (such as back-end profiler 112B) can expose profiling data from a Java application executing on a back-end VM, such as back-end VM 114. The back-end profiler 112B can use a Java Virtual Machine Tool Interface (JVMTI) to collect profiling data from the JVM. In some example embodiments, the JVM can provide an interface to load the back-end profiler 112B, such as an agent, into the JVM process. In some example embodiments, a proprietary implementation can directly integrate the back-end profiler 112B into the JVM.

In some example embodiments, during a profiling session, a user can directly connect to the VM that includes the profiler (e.g., back-end VM 114 that includes back-end profiler 112B). The user can interactively request that profiling data be sent from the back-end profiler 112B to the front-end profiler 112A, although it is not necessary that the user be aware of the split between the front-end profiler 112A and the back-end profiler 112B. The front-end profiler 112A and the back-end profiler 112B can communicate with each other using a client application programming interface (API) 120 and a server API 122 respectively. For example, computer system 106 can establish a socket connection between the back-end profiler 112B and the front-end profiler 112A. The front-end profiler 112A and the back-end profiler 112B can be located on physically different machines. The profiling data can be transferred from the back-end profiler 112B to the front-end profiler 112A by way of a socket connection or the transfer of one or more files. The front-end profiler 112A can receive the profiling data and prepare it for analysis and display to a user.

In some example embodiments, the computer system 106 can directly connect to the client 102 without the use of the network 104. In some example embodiments, the front-end VM 116 and the back-end VM 114 may run on the same machine.

In some example embodiments, the front-end profiler 112A may be a stand-alone application that can communicate with the back-end profiler 112B included in the back-end VM 114 without the need for a front-end VM 116. More specifically, a front-end profiler may be a stand-alone program or application that is compatible with a back-end profiler. In some example embodiments, the front-end VM 116 can run the front-end profiler stand-alone application. The front-end profiler stand-alone application can analyze additional stand-alone applications running on the front-end VM. The front-end profiler stand-alone application can also analyze applications running on the back-end VM 114.

In some example embodiments, the front-end profiler 112A and the back-end profiler 112B can be integral parts of the front-end VM 116 and back-end VM 114, respectively. This can allow for "on-demand" examination of applications running on the back-end VM 114. Because the front-end VM 116 and back-end VM 114 include profilers, the profiling can occur during runtime without the need to restart the front-end VM 116 or back-end VM 114. Including a profiler in a VM also reduces the memory usage typically required, thereby minimizing the memory overhead of the computer system 106.

In an example embodiment, the server API 122 can start and stop the VM included in the back-end VM 114 that includes the application for profiling. The back-end profiler 112B can record the profiling data for the application running on the back-end VM 114. In some example embodiments, the back-end profiler 112B can store the profiling data as one or more profiling files in the profiling database 110. In some example embodiments, the back-end profiler 112B can send the profiling data to the front-end profiler 112A for further processing.

A remote profiling session can occur when a host or server (e.g., server 108) that includes the application for profiling is remotely located from the client (e.g., client 102) running the application that initiates the profiling session. For example, system 100 shows an exemplar remote profiling session where the back-end VM 114 is running an application that includes the back-end profiler 112B, and the client 102 initiates the profiling session from the front-end VM 116, which includes front-end profiler 112A. In a remote profiling session, opening a debugging port to the back-end VM 114 can switch the back-end VM 114 into a profiling mode. Using client 102, a user can connect to the back-end VM 114 for profiling by connecting to the debugging port. As shown in FIG. 1, in this example embodiment, the back-end profiler 112B is an integral part of the back-end VM 114. As described above, this can allow the back-end VM 114 to be switched into a profiling mode "on demand" during execution of the back-end VM application without the need to restart the back-end VM application.

In some example embodiments, a local profiling session can occur when the application for profiling and the application that initiates the profiling session are located on the same host or server (e.g., the same physical machine). The local profiling session can perform simultaneous source code implementation, testing, debugging, and profiling. The host can include a local display device that displays a GUI to a user. The GUI can allow the user the ability to control and configure the profiling session.

In some example embodiments, a user can perform a remote or local profiling session in an online or interactive mode. In an online profiling session, a front-end profiler (e.g., front-end profiler 112A) can initiate a profiling session with a back-end profiler (e.g., back-end profiler 112B). For example, a user interacting with a GUI displayed on display device 118 can start and stop the profiling session as well as interact with the back-end profiler 112B during the profiling session. The interaction can include configuring and controlling the profiling session as well as receiving profiling data. The user can request the resultant profiling data from the back-end profiler 112B for display on the display device 118. The back-end profiler 112B can open a debugging port to the back-end VM 114 when the front-end profiler 112A initiates an online profiling session with the back-end profiler 112B. The back-end VM 114 can then wait for a connection. The front-end VM 116 that includes the front-end profiler 112A can connect to the debugging port using client API 120 and server API 122 by way of network 104.

In an example embodiment, an automatic profiling report generation tool 124 may be integrated into the front-end profiler 112A to execute a set of analysis steps using a given set of profiling data. The automatic profiling report generation tool 124 may present, for example, a command line or GUI to the user allowing the user to enter or record a series of analysis steps. In general these steps may comprise filtering the profiling data and drilling down to the cause of the problem. In an example embodiment, the analysis begins by selecting a part, called a snapshot, or all of the profiling data. Then the profiling data may be grouped according to some predefined criteria into a statistic. The kinds of supported statistics depend on the events being traced in the profiling data. For example, if the memory consumption should be profiled, the amount of memory being allocated per class type may constitute a statistic type. For runtime performance, a sensible statistic type would be to show the accumulated time spent in a method in a tabular view.

From the initial statistic, each further analysis step may involve changing the current statistic by sorting, selecting, or expanding entries and/or using the selected data as input for a different grouping according to another criteria. For example in the memory consumption scenario, it might be interesting to know where the top allocations actually happen in the source code. Therefore, it is a good starting point to use the statistic showing the allocations per class type, then selecting the top entries, e.g., the top 10, and afterwards navigating to a method statistic based on the current selection.

The navigation targets may be context sensitive and dependent on the current statistic or tree. The possible analysis steps also depend on the current statistic or tree. For example, it may not make sense to expand statistic table entries while it may be very useful to be able to expand tree items. Besides the already mentioned operations of selection, sorting, and expanding, it is also possible to add/remove columns or graph areas. In addition to that, it is possible to change the inlining of methods, i.e., adapt the stack traces of profiling events and account the profiling data to the calling method.

The analysis steps may be executed by the automatic profiling report general tool back-end. After several such analysis steps are executed, the result may be exported. The export format may be machine readable, such as Extensible Markup Language (XML), or human readable, e.g., HyperText Markup Language (HTML) or pure text. Depending on the output format, the profiling results may be rendered into graphics or just exported as numbers. This export may be sent to the automatic profiling report generation tool for display.

Following the export of some profiling data, it is possible to do more analysis steps or start with a new analysis. Usually more than one view of the profiling data is used to come to an informed decision concerning a performance bottleneck.

In some implementations, in an online profiling session, a user may optionally store the profiling data received from the back-end VM in a local file (e.g., a file located on the client 102 as part of a local file system or repository). The user can access the locally stored profiling data file at any time after the completion of the profiling session.

In some implementations, a user can perform a remote or local profiling session in an offline or non-interactive mode. In an offline profiling session, a front-end profiler (e.g., front-end profiler 112A) can initiate a profiling session with a back-end profiler (e.g., back-end profiler 112B) but there is no interaction between the front-end profiler (e.g., front-end profiler 112A) and the back-end profiler (e.g., back-end profiler 112B) during the profiling session. For example, the computer system 106 can provide an interface to couple the front-end VM 116 to the back-end VM 114 using the server API 122 in order to start and stop the profiling session. The back-end VM 114 that includes the back-end profiler 112B can store the profiling data in the profiling database 110 and/or a file. For example, a user interacting with a GUI displayed on the display device 118 can start and stop the profiling session. Once complete, the user can request that the profiling data be stored in the file in the profiling database 110 from the computer system 106 (e.g., the user can interact with a GUI displayed on display device 118 to initiate the request). The client 102 can receive the profiling data file and display its contents to the user on the display device 118.

In an offline profiling session, storing profiling data for the profiling session in a profiling file on profiling database 110 can enable a user to retrieve profiling data for a back-end VM (e.g., back-end VM 114) at any point after the profiling session is complete. For example, the stored profiling data can be retrieved from the profiling database 110 whether or not the back-end VM (e.g., back-end VM 114) is running.

Figure 2:
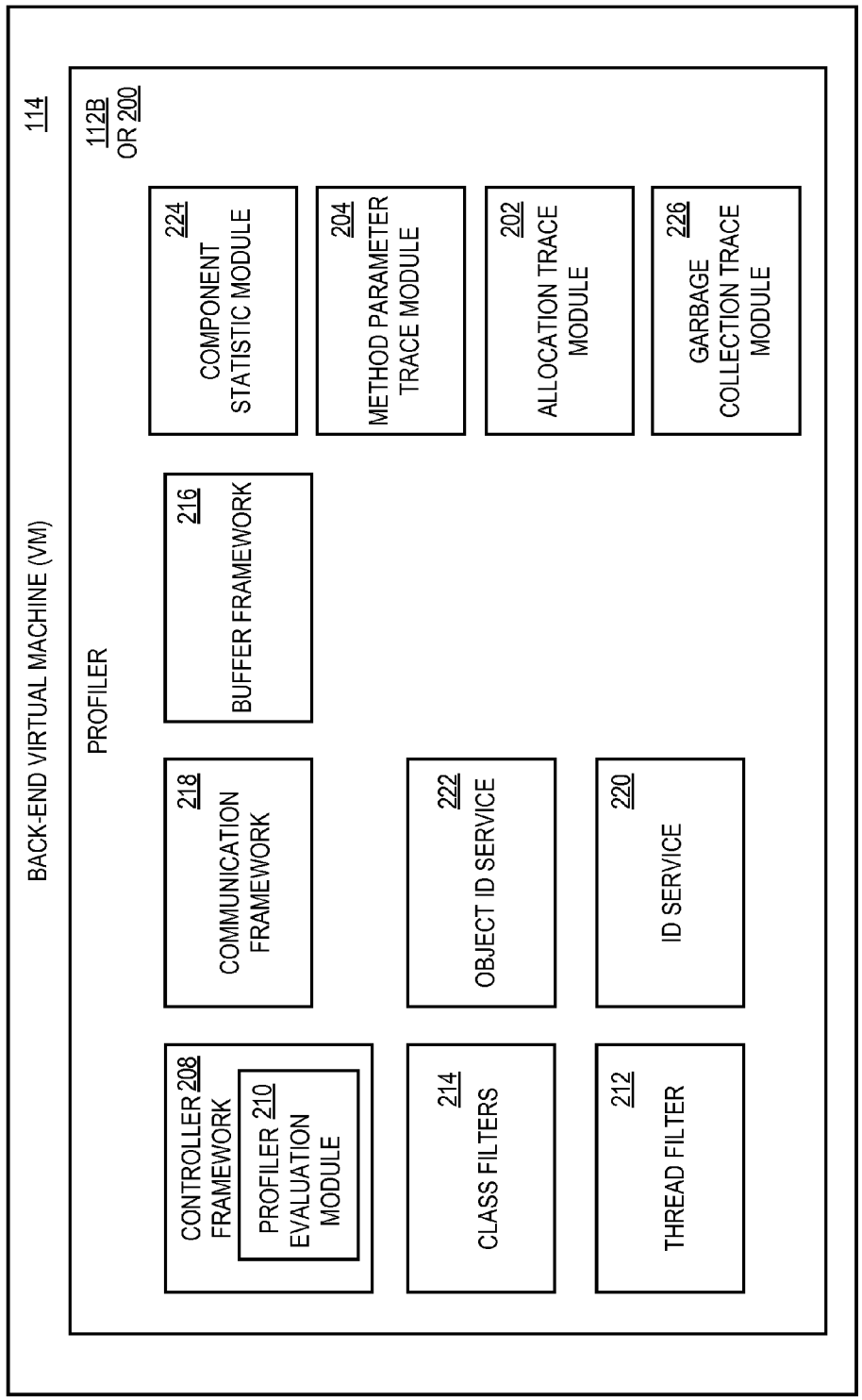
FIG. 2 is a block diagram illustrating a back-end profiler, in accordance with an example embodiment, in more detail.

FIG. 2 is a block diagram illustrating a back-end profiler 200, in accordance with an example embodiment, such as back-end profiler 112B of FIG. 1, in more detail. The back-end profiler 200 can include a plurality of profiler modules, filters, and frameworks. The back-end profiler 200 can include an allocation trace module 202, a method parameter trace module 204, and additional trace modules. Each profiler trace module can capture a stream of events that match the criteria of the module (e.g., an allocation trace module 202 can record all memory allocation events in the profiled application).

The back-end profiler 200 can include a controller framework 208. In some example embodiments, the controller framework 208 can start and stop profiling sessions as well as traces during a profiling session. The controller framework 208 can allow a user to select specific back-end profiler options and settings for a profiling session. For example, the front-end profiler 112A can display a GUI to the user on display device 118 that displays the options and settings for the back-end profiler 200. The user, interacting with the GUI, can select specific back-end profiler options and settings for a profiling session.

The back-end profiler settings can include functional settings and filter settings. Functional profiler settings can determine the functional area of the application code to profile. For example, a functional profiler setting can specify the types of traces to perform for the profiling session (e.g., an allocation trace, a method parameter trace, and/or a performance trace). Filter profiler settings can define a validity scope (e.g., user, session, thread, VM, etc.) for the functional profiler setting for the profiling session. For example, referring to FIG. 1, a user, operating client 102, can start an allocation trace in the back-end profiler 112B.

The profiler options can include specific monitoring, debugging, and analysis functions. For example, profiler options can include memory debugging (e.g., memory leak detection), performance analysis (e.g., hotspot identification), synchronization monitoring, and application debugging (e.g., called method detection). By way of non-limiting example, the profiling functions can include one or more sub-functions (e.g., heap dump, time-based sampling, memory-based sampling, allocation trace, method parameter trace, garbage collection trace, etc.). Allocation analysis can identify and isolate memory related problems in an application. Allocation analysis can be used for memory debugging.

Performance analysis can monitor an application's behavior using information gathered as the application executes. Performance analysis can determine which parts of an application can be optimized for speed. In some implementations, performance analysis can indicate where within the application the method spent its time during execution thereof. Performance analysis can indicate which methods called other methods while the application executed. The profiling data gathered during a performance analysis can indicate which areas of the application are slower than expected. Performance hotspots (or bottlenecks) can be code segments in the application that can contribute significantly to overall application execution time. In some implementations, a performance hotspot can slow down or halt application execution. Identification of performance hot spots enables improvement of the code segment to improve the overall performance of the code at runtime.

In some example embodiments, the controller framework 208 may include a profiler evaluation module 210 for analyzing profiling data. The server API 122 can obtain the complete profiling data for a profiling session. The profiler evaluation module 210 can analyze the complete profiling data for the profiling session and generate problem oriented, condensed profiling data for the profiling session. The server API 122 can also obtain the condensed profiling data from the back-end VM 114. A user may use the condensed profiling data to identify one or more problematic areas in a profiled application. Additionally, the automatic profiling report generation tool 124 can use the condensed profiling data when performing its analysis steps. For example, a profiling session can perform a performance analysis on an application using a time-based sampling approach. The time-based sampling approach for performance analysis can be referred to as a statistical analysis. In some implementations, a profiling session can perform a performance analysis on an application using one or more actual events in the application (e.g., a method call) as indicators for tracing the execution path of the application.

In some example embodiments, the controller framework 208 provides low-level profiling data to the automatic profiling report generation tool 124 for use in performing its analysis steps.

In some implementations, a user can use the controller framework 208 to start and stop profiling sessions, and to enable profiler traces for a session. For example, the user can determine one or more profiler traces to enable during a profiling session. In a single profiling session, the user may enable an allocation trace that uses the allocation trace module 202 and a method parameter trace that uses the method parameter trace module 204.

In some example embodiments, the controller framework 208 can enable the server 108 to specify a thread filter 212. The thread filter 212 can include names and identifiers associated with a profiling session for a particular thread (e.g., a thread executing on the back-end VM 114) and can indicate the existence of one or more profiler traces for the profiling session. For example, the names and identifiers can be a client identifier, a user identifier, a profiling session identifier, a request identifier, an application name, and a component name. By way of non-limiting example, the thread filter 212 can filter out specific events in the profiling data (e.g., all allocations from a specified thread). In some implementations, the controller framework 208 can "tag" the names and identifiers to the thread. The server 108 can set the current thread state using the information in the thread filter 212.

Class filters 214 can limit the recording of profiling data for a particular trace to a designated method within a class included in the class filters 214. For example, when enabling an allocation trace in a profiling session, a user can enable a profiler to record allocation trace data for Java object allocations, which refer to instances of the java.lang.HashMap class. The java.lang.HashMap class can be included in the class filter.

A buffer framework 216 can compress or decompress profiling data. The compressed or decompressed profiling data can be communicated (e.g., sent to the client 102) or stored (e.g., placed in a profiling file and stored in profiling database 110). For example, in an offline profiling session, the buffer framework 216 can compress profiling data for storage as a profiling file in database 110. When requested by a client (e.g., client 102), the buffer framework 216 can decompress the profiling data in the profiling file for communication back to the client (e.g., client 102) and subsequent viewing of the profiling data by a user in a GUI on a display device (e.g., display device 118).

Communication framework 218 can facilitate the communication of profiling data and information between and within various components (e.g., elements, modules, systems, servers, VMs, etc.) included in the computer system 106. Additionally, the communication framework 218 can determine and facilitate the storing of profiling data (e.g., profiling data in a profiling file stored in the profiling database 210).

An identification (ID) service 220 can assign a numerical identifier to an alphanumeric name. For example, the ID service 220 can assign a numeric identification value to a class name (e.g., java.lang.HashMap class can be assigned the number "101") creating a numeric ID tag for the class. A numerical identifier can also be assigned to a method, a class, and/or a class loader. For example, because a class, a method, and/or class loader are not just specified by their name (e.g., there can be more classes of the same name, if they are loaded by different class loaders), using just a name to identify mapping would not allow differentiation between different classes, methods, or class loaders of the same name. In some example embodiments, a mapping packet can map and group classes, methods, and/or class loaders according to their numerical ID tags (e.g., their assigned numerical values). In some example embodiments, the ID service 220 can assign numeric IDs to threads. An object ID service 222 can assign numeric IDs to objects. The use of numeric IDs can result in improved efficiency and speed during a profiling session as objects, threads, methods, and classes can be sorted, grouped, and compared using the numeric IDs instead of an alphanumeric name. The use of numeric IDs can also result in decreased memory consumption during a profiling session.

A method parameter trace module 204 can trace the values of method parameters. For example, a method parameter trace can check if specific parameter values used in a method lead to excessively long execution times for the method. Additionally, a method parameter trace can provide an overview of the parameter values used by the method during the execution of the application in a profiling session.

In some example embodiments, and as noted above, the raw profiling data can be provided to the front-end from the back-end for higher-level processing. For example, the front-end can process the profiling data to group one or more consecutive methods in a stack trace into a component, and categorize the trace data at the stack level. For example, when a profiling session includes a time-based sampled allocation trace, the memory allocation quantity can be attributed to a stack trace. In other example embodiments, the higher-level processing can occur at the back-end. For example, a component statistic module 224 can group one or more consecutive methods in a stack trace into a component. A component can be a specific API used by the application. Examples of components can be Java components that can include, but are not limited to, a persistence API, a security API, a portal API, and a servlet API. The methods in the stack trace can be grouped into components based on a defined "entry method" for the component. The component statistic module 224 can then categorize the trace data at the stack level. The stack trace including methods can be grouped into components, where one or more consecutive methods can be placed into one component group. Each component group can provide allocation statistics for the API associated with the component.

A garbage collection (GC) trace module 226 can trace GC events in an application. For example, a Java runtime environment can use a garbage collector to perform GC to reclaim memory allocated to an object but no longer needed. Once the garbage collector determines that the object is no longer accessible (e.g., when there is no longer any references to it stored in any variables, the fields of objects, or the elements of any arrays), the garbage collector can reclaim the allocated memory. For example, when a Java application no longer references a particular object, a heap space occupied by the object can be recycled so that the heap space can be made available for subsequently created objects.

Turning now to the operation of the automatic profiling report generation tool, in an example embodiment, the automatic profiling report generation tool may provide several modes of execution. It may be useful to have a manual (interactive) mode to experiment with and determine what kind of report is actually needed. An automatic mode may then take a defined report specification and execute the analysis steps for a given set of profiling data.

The interactive mode allows the same analysis steps as the automatic mode, but may supply additional output such as the number of entries of the current statistic. Using the additional context information, the user may choose the next analysis steps. Once the user is satisfied with the result, the whole report may be exported to a text file that can be later utilized for automatic report generation.

The definition of the profiling report specification may take place in an environment such as a command shell. However, in another example embodiment, it is possible to use a graphical development environment that allows the user to specify the report by choosing the analysis steps using a mouse and rearranging the steps using drag and drop. In another example embodiment, the user may perform the selection of analysis steps as part of a manual mode but with the system "recording" the actions taken by the user. The actions taken may then be presented to the user at the end of the session asking the user whether these steps should be included in an automatic profiling report specification. Regardless of the mechanism for interaction, these aspects may take place in the automatic profiling report generation tool 124.

In general, as described in detail above, there is a distinction between the profiling back-end and the profiling front-end. While collecting the profiling data is the main task of the profiling backend, the profiling frontend addresses the analysis of the profiling data. It is possible to semi-automatically create a profiling report generation tool from an existing profiling frontend.

Figure 3:
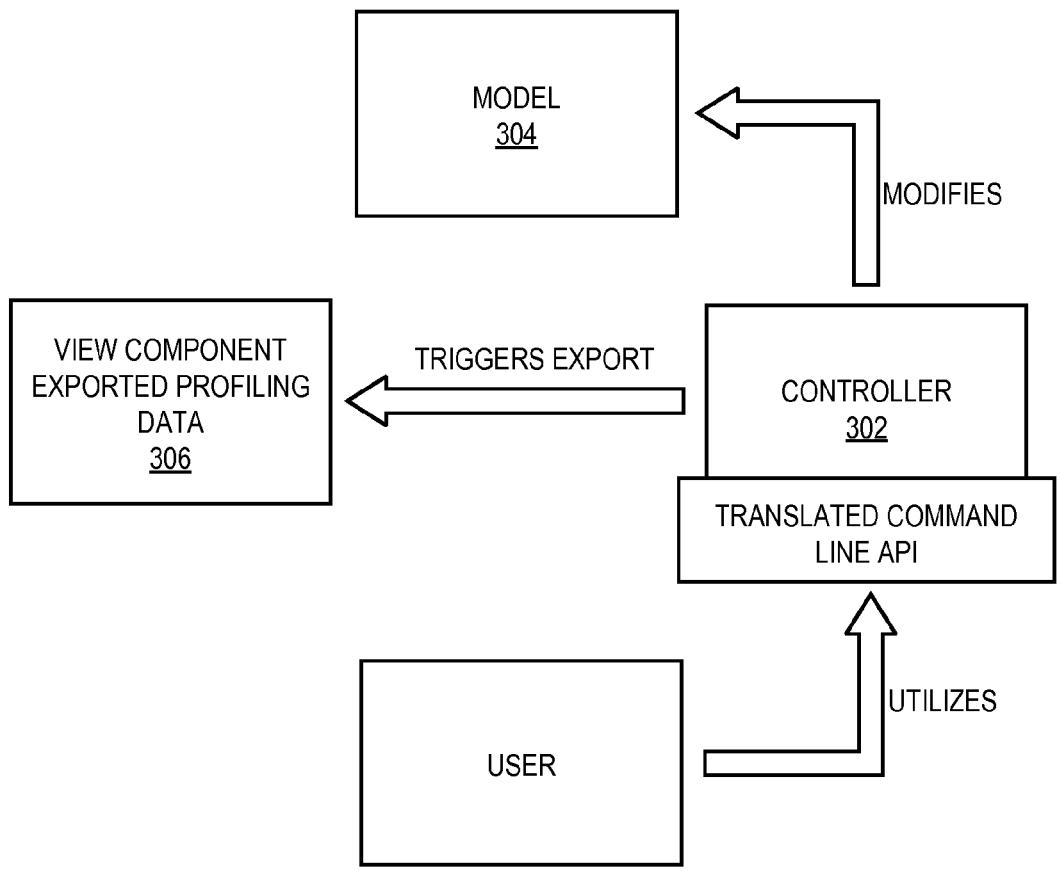
FIG. 3 is a block diagram illustrating an automatic profiling report generation tool front-end, in accordance with an example embodiment, in more detail.

FIG. 3 is a block diagram illustrating an automatic profiling report generation tool front-end, in accordance with an example embodiment, such as automatic profiling report generation tool 124 of FIG. 1, in more detail. A controller 302 may act to control input from a user and use that input in a model 304. In such a system, the model 304 manages the actual data. One or more view components 306 handle the display of the values in a proper representation, be it graphical or textual in nature. The controller 302 handles state changes and actions that update the model 304. The model 304 notifies its listeners about changes (e.g., so that the views can update themselves accordingly).

Due to the fact that the controller of the profiling front-end already captures actions such as selection, sorting, and navigation, it is possible to semi-automatically create a profiling report generation tool from the API of the controller components. This reduces the amount of work used to create such a tool by a huge factor.

Each controller instance can serve as the current context of a given statistic. Operations changing the state of the controller return either the adapted controller or a new controller instance in case a navigation step yields a new statistic. Each action can be triggered by a corresponding method in the API. Therefore, the method can be converted into a corresponding command line interface command by adapting the method name. For example, CamelCase is often used for method names in Java (e.g., createNewMethodStatistic). This name can be automatically translated into a command 'create new method statistic' by separating the words according to the CamelCase style and inserting whitespace between the words.

Using this approach, most of the automatic profiling report generation tool can be implemented through automatic conversion. Some adaptions may be used when the method names of the controller API do not adhere to the desired conventions (e.g., if another naming style was used). These cases can be handled by the use of an additional mapping between controller API names and desired commands.

The parameters of the controller API methods may also be directly converted into command arguments. However, for many operations, no arguments are necessary because the information is already stored in the current context. For example, a navigation step may have the source entries of the navigation as parameters. However, the selection can be used instead if the selection is already stored as part of the controller context. The operation can then be split into two simpler operations (i.e., a selection step and a navigation step).

Below is an example of a report definition to be directly converted into command arguments:

```
open allocation snapshot 0
goto class statistic
select top 10
goto calling method tree
expand all depth=10
export as html to report.html title=Top Consumers
```

FIG. 4 is an example of a report generated by an automatic profiling report generation tool from the above report definition, in accordance with an example embodiment. As can be seen, the automatic profiling report generation tool has taken the report definition and executed it on profiling data, resulting in a chart 400 conveying the amount of memory utilized 402 and objects utilized 404 by each of the top 10 classes 406 in the application.

Figure 5:
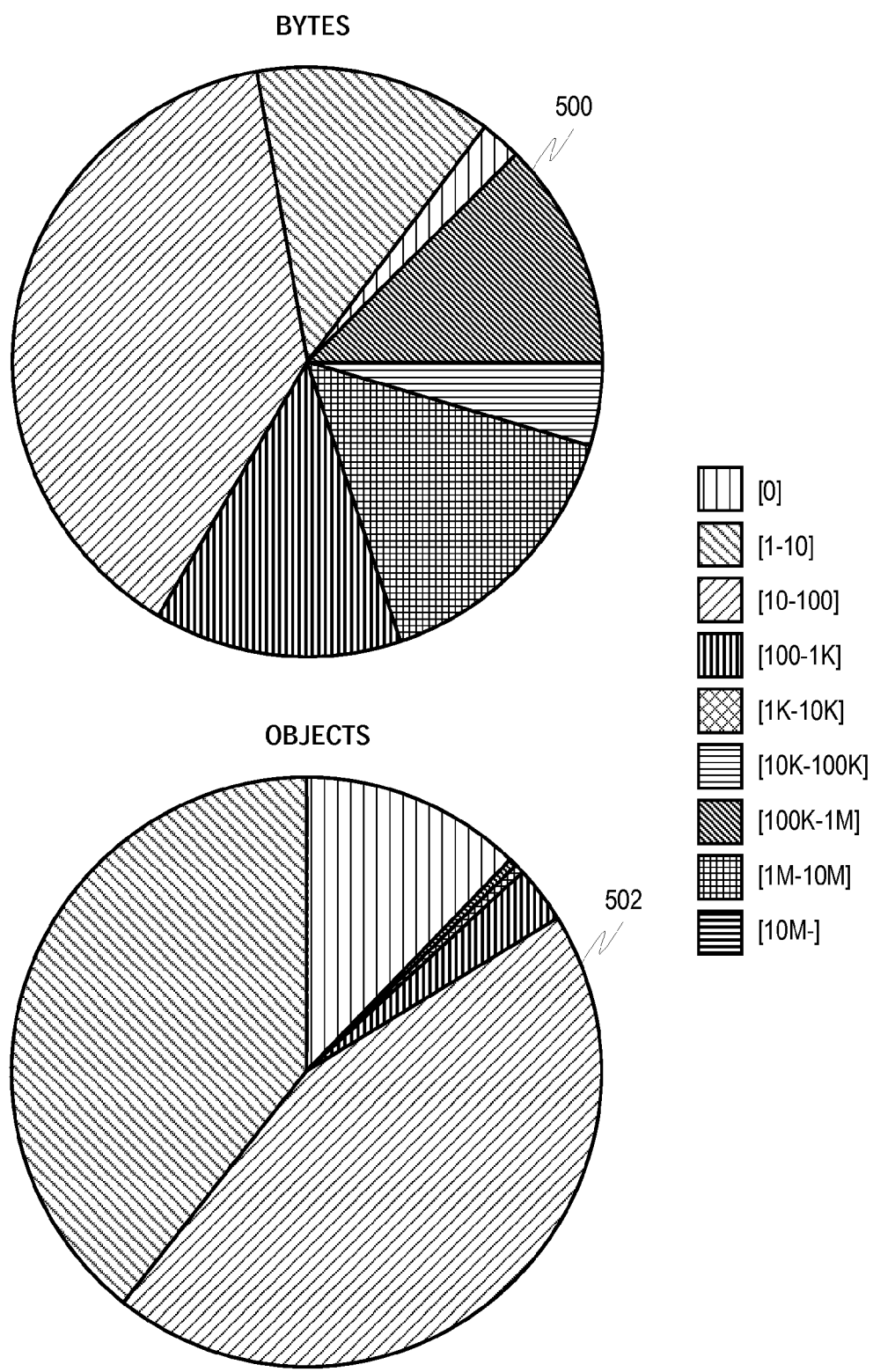
FIG. 5 is an example of another report generated by an automatic profiling report generation tool from the above report definition, in accordance with an example embodiment.

FIG. 5 is an example of another report generated by an automatic profiling report generation tool from the above report definition, in accordance with an example embodiment. Here, results are presented in the form of two pie charts 500, 502.

Figure 6:
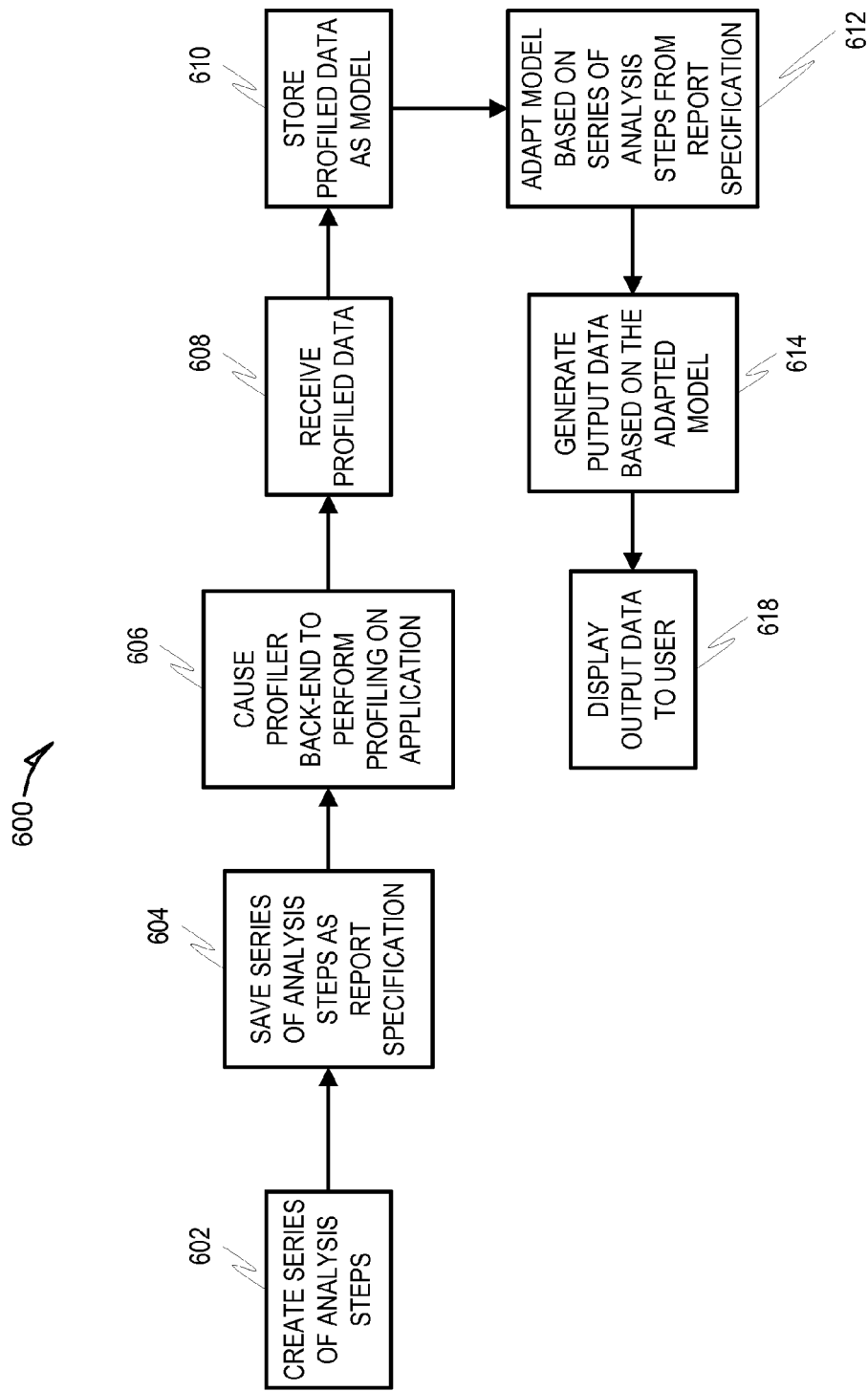
FIG. 6 is a flow diagram illustrating a method, in accordance with an example embodiment, for profiling an application on a virtual machine.

FIG. 6 is a flow diagram illustrating a method 600, in accordance with an example embodiment, for profiling an application on a virtual machine. In an example embodiment, the method is performed by the front-end profiler 112A.

At operation 602, a series of analysis steps to be performed on profiled data is created. As described earlier, this may be performed in a number of different ways. In one example embodiment, a user may enter the analysis steps via a command line interface. In another example embodiment, the user may enter the analysis steps via a GUI, such as by dragging and dropping analysis steps into a window. In another example embodiment, the user may set a recorder to record analysis steps undertaken by the user in a reporting tool, and then utilize some or all of the recorded analysis steps as the analysis steps for this operation. In another example embodiment, a system may automatically monitor user report interaction and automatically deduce proper analysis steps to create. In a variation of this example embodiment, the system may use feedback from users and other systems in performing this automatic deduction of proper analysis steps.

At operation 604, the series of analysis steps may be saved as a report specification. In an example embodiment, this report specification may be saved locally on the same device operating the front-end profiler. In an example embodiment, operations 602 and 604 may be performed by an analysis module in the front-end profiler.

At operation 606, a profiler back-end is caused to perform profiling on the application. This may be performed by communicating with the profiler back-end via a client API, possibly with a set of profiling parameters and instructions to profile an application on a virtual machine using those profiling parameters.

At operation 608 profiled data may be received from the back-end profiler. In an example embodiment, operations 606 and 608 may be performed by an interface module in the front-end profiler. At operation 610, the profiled data may be stored as a model. In an example embodiment, this model may be saved locally on the same device operating the front-end profiler.

At operation 612, the model may be adapted based on the series of analysis steps from the report specification. This may include translating the analysis steps of the report specification based on the client API.

At operation 614, output data may be generated based on the adapted model. The output data may be textual and/or graphical in nature. In an example embodiment, operations 610, 612, and 614 may be performed by a model adaptation module in the front-end profiler. At operation 616, the output data is displayed to a user. In an example embodiment, operation 616 may be performed by a display module in the front-end profiler.

Figure 7:
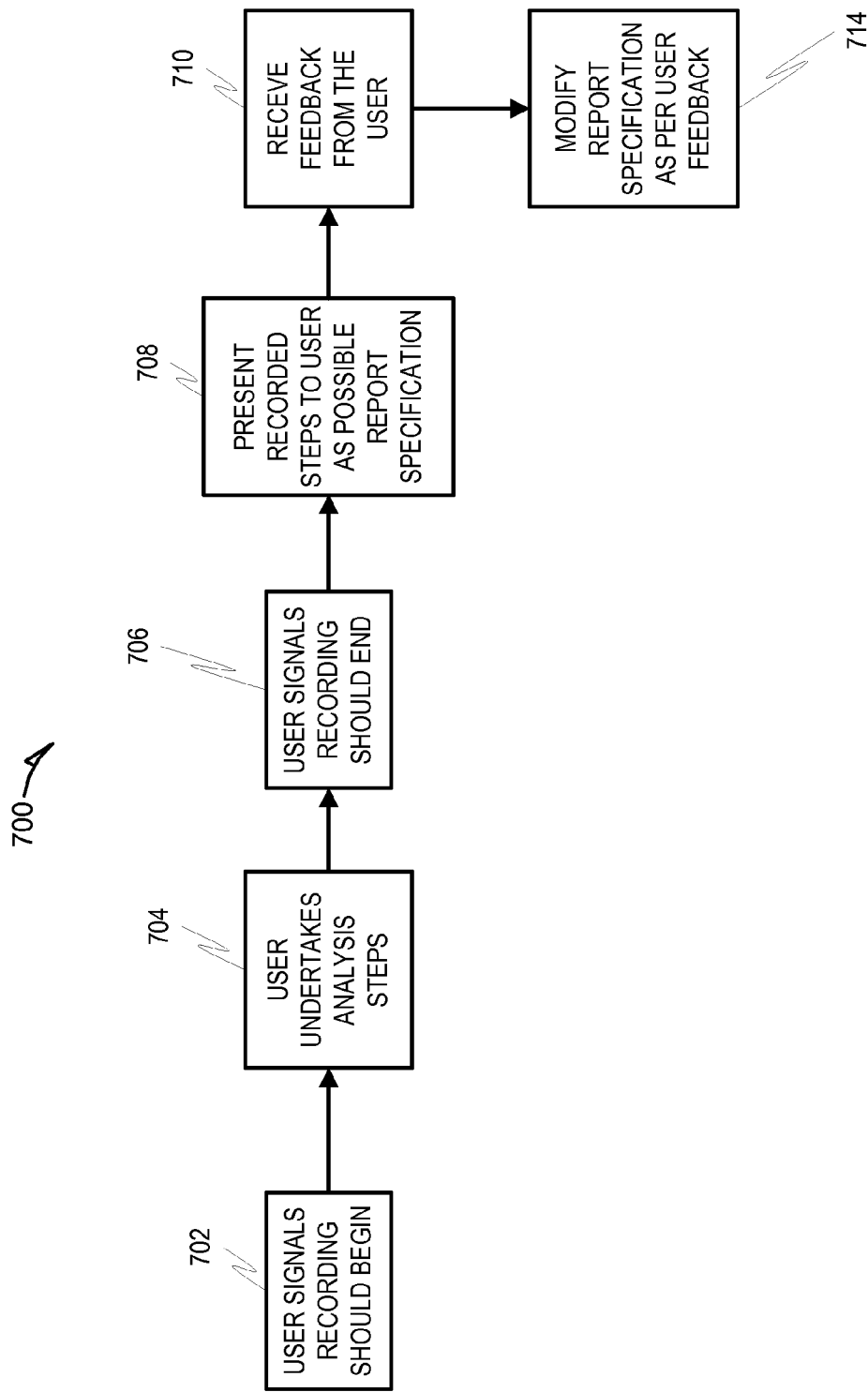
FIG. 7 is a flow diagram illustrating a method, in accordance with an example embodiment, for recording analysis steps.

FIG. 7 is a flow diagram illustrating a method 700, in accordance with an example embodiment, for recording analysis steps. This method 700 may be performed, for example, as part of the creating process in operation 602 of FIG. 6. At operation 702, a user may signal that recording should begin. This may be accomplished by, for example, pressing a button labeled "record" in a GUI of a profiling report tool. At operation 704, the user may undertake one or more analysis steps using the profiling report tool. At operation 706, the user may signal that recording should end. This may be accomplished by, for example, pressing the button labeled "record" again, signifying that recording should stop. At operation 708, the analysis steps undertaken in operation 704 are presented to the user as a possible report specification. At operation 710, feedback is received from the user as to how to modify the report specification. This may include the user, for example, deleting and reordering analysis steps. At operation 712, the report specification is modified as per the user feedback.

It should be noted that while FIG. 7 describes the user explicitly signaling that recording should begin or end, it should be noted that embodiments are possible where one or both such steps are undertaken automatically. For example, the user may signify that recording should begin by pressing a record button, but recording ends when the user ends the analysis session, without the need for the user to explicitly stop the recording.

Figure 8:
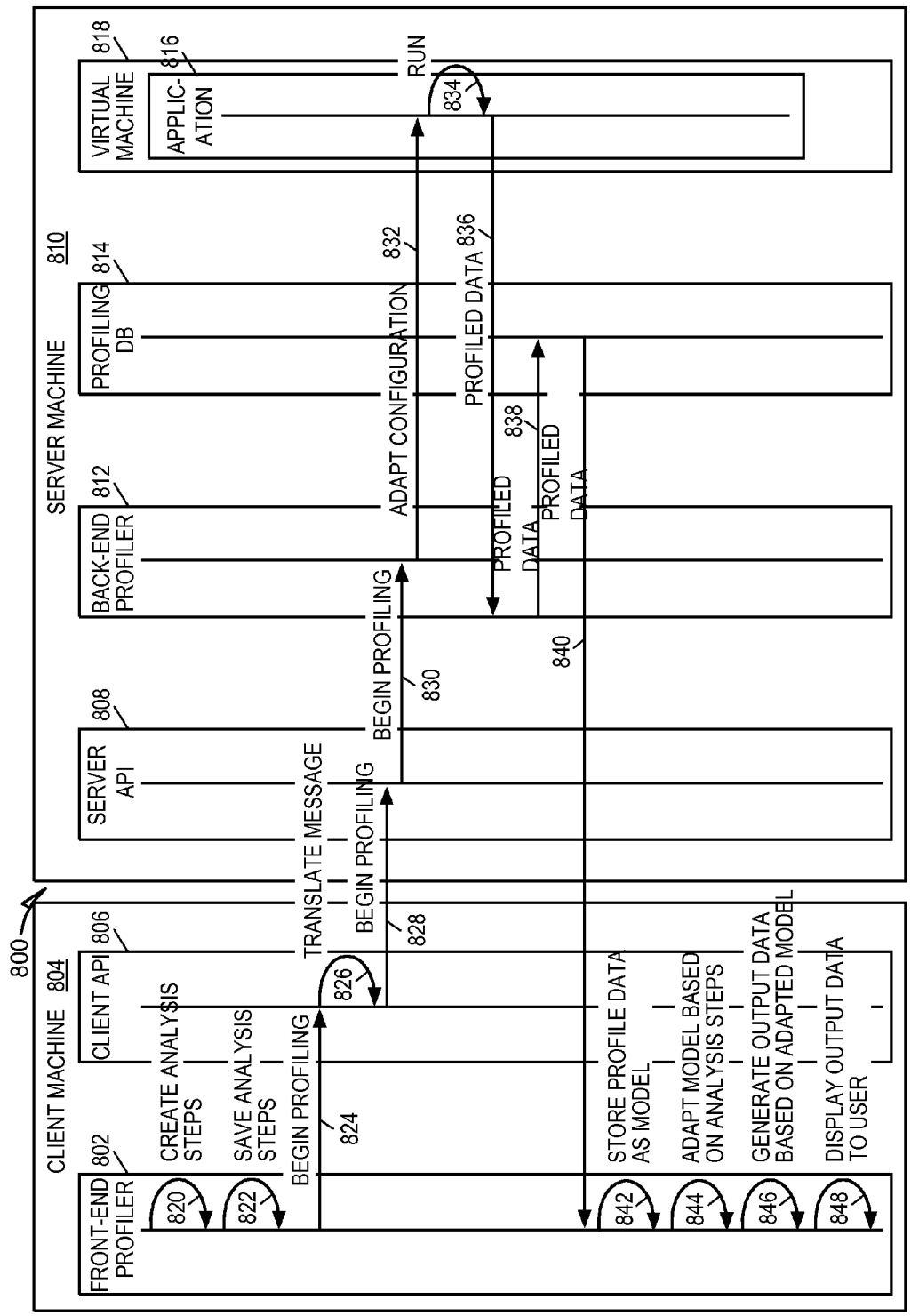
FIG. 8 is a sequence diagram illustrating a method, in accordance with an example embodiment, for profiling an application on a virtual machine.

FIG. 8 is a sequence diagram illustrating a method 800, in accordance with an example embodiment, for profiling an application on a virtual machine. The method 800 may utilize a front-end profiler 802 operating on a client machine 804, a client API 806 operating on the client machine 804, a server API 808 operating on a server machine 810, a back-end profiler 812 operating on the server machine 810, a profiling database 814 operating on the server machine 810, and an application 816 operating in a virtual machine 818 on the server machine 810. It should be noted that in some example embodiments, the back-end profiler 812 and profiling database 814 also operate on the virtual machine 818.

At operation 820, a series of analysis steps to be performed on profiled data is created by the front-end profiler 802. As described earlier, this may be performed in a number of different ways. In one example embodiment, a user may enter the analysis steps via a command line interface. In another example embodiment, the user may enter the analysis steps via a GUI, such as by dragging and dropping analysis steps into a window. In another example embodiment, the user may set a recorder to record analysis steps undertaken by the user in a reporting tool, and then utilize some or all of the recorded analysis steps as the analysis steps for this operation. In another example embodiment, a system may automatically monitor user report interaction and automatically deduce proper analysis steps to create. In a variation of this example embodiment, the system may use feedback from users and other systems in performing this automatic deduction of proper analysis steps.

At operation 822, the series of analysis steps may be saved as a report specification by the front-end profiler 802. In an example embodiment, this report specification may be saved locally on the same client machine 804.

At operation 824, a message is sent from the front-end profiler 802 to the client API 806 to begin profiling. The client API 806 then translates this message at operation 826, and passes the translated message at operation 828 to the server API 808, which in turn passes it to back-end profiler 812 at operation 830. This message may include a set of profiling parameters and instructions to profile an application on a virtual machine using those profiling parameters.

At operation 832, configuration of the application 816 is adapted based on the profiling parameters. At operation 834, the application 816 is run using the adapted configuration, which at operation 836 generates profiled data. At operation 838, the profiled data is stored in the profiling database 814. At operation 840, the profiled data is transferred from the profiling database 814 to the front-end profiler 802.

At operation 842, the profiled data may be stored as a model. In an example embodiment, this model may be saved locally on the client machine 804.

At operation 844, the model may be adapted based on the series of analysis steps from the report specification. This may include translating the analysis steps of the report specification based on the client API.

At operation 846, output data may be generated based on the adapted model. The output data may be textual and/or graphical in nature. At operation 848, the output data is displayed to a user.

Example Mobile Device

Figure 9:
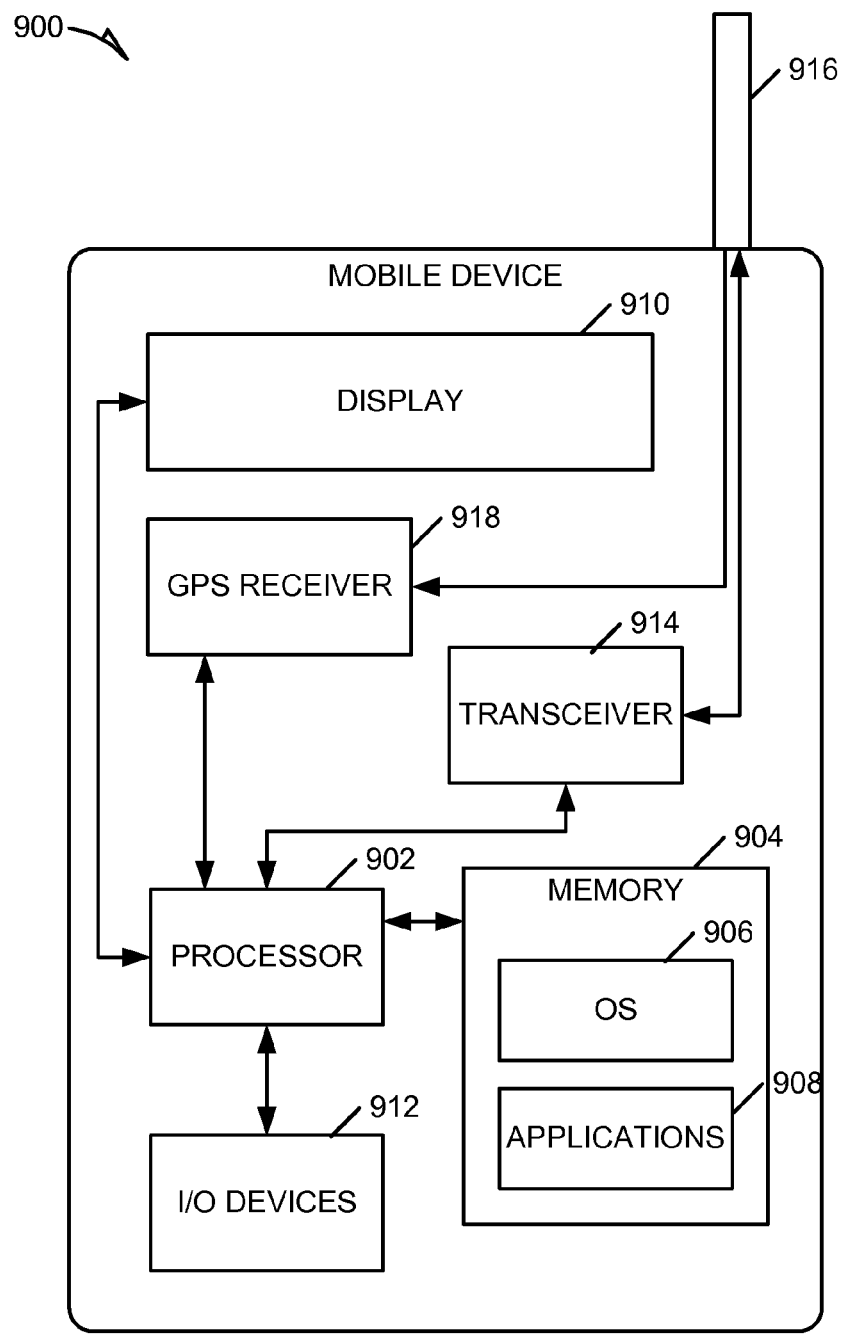
FIG. 9 is a block diagram illustrating a mobile device, according to an example embodiment.

FIG. 9 is a block diagram illustrating a mobile device 900, according to an example embodiment. The mobile device 900 can include a processor 902. The processor 902 can be any of a variety of different types of commercially available processors 902 suitable for mobile devices 900 (for example, an XScale architecture microprocessor, a microprocessor without interlocked pipeline stages (MIPS) architecture processor, or another type of processor 902). A memory 904, such as a random access memory (RAM), a flash memory, or another type of memory, is typically accessible to the processor 902. The memory 904 can be adapted to store an operating system (OS) 906, as well as application programs 908. The processor 902 can be coupled, either directly or via appropriate intermediary hardware, to a display 910 and to one or more input/output (I/O) devices 912, such as a keypad, a touch panel sensor, a microphone, and the like. Similarly, in some embodiments, the processor 902 can be coupled to a transceiver 914 that interfaces with an antenna 916. The transceiver 914 can be configured to both transmit and receive cellular network signals, wireless data signals, or other types of signals via the antenna 916, depending on the nature of the mobile device 900. Further, in some configurations, a Global Positioning System (GPS) receiver 918 can also make use of the antenna 916 to receive GPS signals.

Modules, Components and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client, or server computer system) or one or more processors 902 can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor 902 or other programmable processor 902) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 902 configured using software, the general-purpose processor 902 can be configured as different hardware-implemented modules at different times. Software can accordingly configure a processor 902, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple of such hardware-implemented modules exist contemporaneously, communications can be achieved through signal transmission (e.g., over appropriate circuits and buses that connect the hardware-implemented modules). In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation, and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors 902 that are temporarily configured (e.g., by software) or permanently configured to perform the relevant operations. Whether temporarily or permanently configured, such processors 902 can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or processors 902 or processor-implemented modules. The performance of certain of the operations can be distributed among the one or more processors 902, not only residing within a single machine, but deployed across a number of machines. In some example embodiments, the processor 902 or processors 902 can be located in a single location (e.g., within a home environment, an office environment, or a server farm), while in other embodiments, the processors 902 can be distributed across a number of locations.

The one or more processors 902 can also operate to support performance of the relevant operations in a "cloud computing" environment or as a "software as a service" (SaaS). For example, at least some of the operations can be performed by a group of computers (as examples of machines including processors 902), these operations being accessible via a network (e.g., the Internet) and via one or more appropriate interfaces (e.g., APIs).

Electronic Apparatus and System

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor 902, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors 902 executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 902), or in a combination of permanently and temporarily configured hardware can be a design choice. Below are set out hardware (e.g., machine) and software architectures that can be deployed, in various example embodiments.

Example Machine Architecture and Machine-Readable Medium

Figure 10:
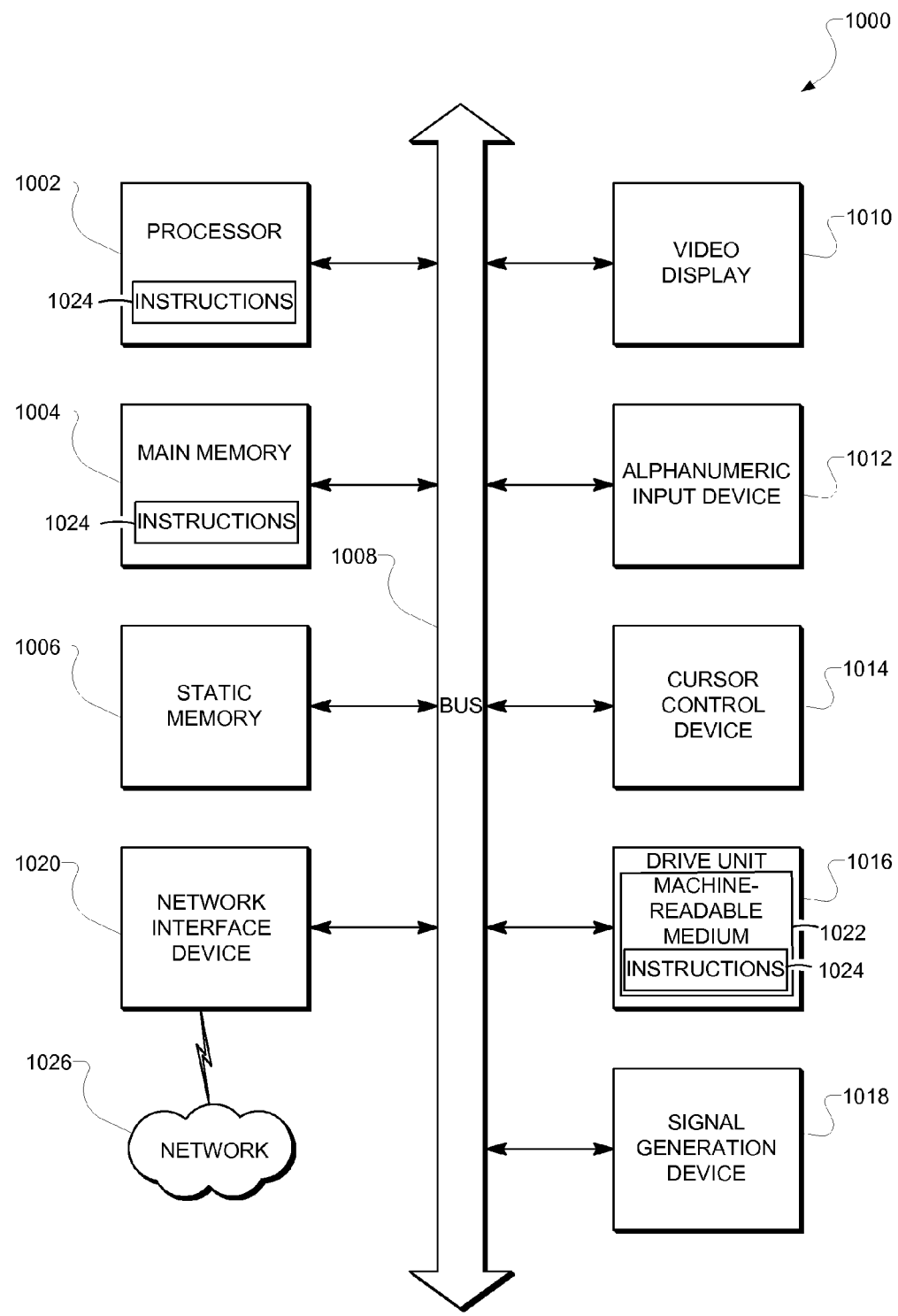
FIG. 10 is a block diagram of machine in the example form of a computer system within which instructions, for causing the machine to perform any one or more of the methodologies discussed herein, can be executed.

FIG. 10 is a block diagram of machine in the example form of a computer system 1000 within which instructions, for causing the machine to perform any one or more of the methodologies discussed herein, can be executed. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a CPU, a graphics processing unit (GPU), or both), a main memory 1004, and a static memory 1006, which communicate with each other via a bus 1008. The computer system 1000 can further include a video display 1010 (e.g., a liquid crystal display (LCD) or a cathode ray tube (CRT)). The computer system 1000 also includes an alphanumeric input device 1012 (e.g., a keyboard or a touch-sensitive display screen), a cursor control device 1014 (e.g., a mouse), a drive unit 1016, a signal generation device 1018 (e.g., a speaker), and a network interface device 1020.

Machine-Readable Medium

The drive unit 1016 includes a machine-readable medium 1022 on which is stored one or more sets of instructions (e.g., software) 1024 embodying or utilized by any one or more of the methodologies or functions described herein. The instructions 1024 can also reside, completely or at least partially, within the main memory 1004 and/or within the processor 1002 during execution thereof by the computer system 1000, with the main memory 1004 and the processor 1002 also constituting machine-readable media.

While the machine-readable medium 1022 is shown in an example embodiment to be a single medium, the term "machine-readable medium" can include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1024 can further be transmitted or received over a communications network 1026 using a transmission medium. The instructions 1024 can be transmitted using the network interface device 1020 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1024 for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computerized method for profiling an application on a virtual machine, the method comprising:
    creating, at a front-end profiler, a series of analysis steps to be performed on profiled data stored in memory;
    saving the series of analysis steps in memory as a report specification;
    causing a back-end profiler to perform profiling on the application, causing output of profiled data;
    receiving, at the front-end profiler, the profiled data from the back-end profiler;
    storing the profiled data as a model;
    adapting, at the front-end profiler, the model based on the series of analysis steps from the report specification;
    generating output data based on the adapted model; and
    displaying the output data to a user.

2. The method of claim 1, wherein the adapting includes translating the series of analysis steps using a client application program interface (API) used to communicate with the back-end profiler.

3. The method of claim 1, wherein the creating a series of analysis steps includes receiving input from a user via a command line interface and translating the input into analysis steps.

4. The method of claim 1, wherein the creating a series of analysis steps includes receiving input from a user via a graphical user interface and translating the input into analysis steps.

5. The method of claim 1, wherein the creating a series of analysis steps includes receiving an indication that user actions in a reporting tool should be recorded, recording the user actions in the reporting tool, and translating the user actions into analysis steps.

6. The method of claim 1, wherein the creating a series of analysis steps includes deducing the analysis steps by monitoring user actions in a reporting tool and receiving feedback on the deductions from users or components.

7. The method of claim 1, wherein the creating a series of analysis steps includes directly converting parameters of a controller Application Program Interface (API) method into command arguments.

8. A system comprising:
    a client machine comprising:
        a front-end profiler comprising:
            an analysis module comprising one or more processors configured to create a series of analysis steps to be performed on profiled data and save the series of analysis steps as a report specification;
            an interface module comprising one or more processors configured to cause a back-end profiler to perform profiling on an application in a virtual machine, causing output of profiled data, and to receive the profiled data from the back-end profiler;
            a model adaptation module comprising one or more processors configured to store the profiled data as a model, adapt the model based on the series of analysis steps from the report specification, and generate output data based on the adapted model; and
            a display module comprising one or more processors configured to display the output data to a user.

9. The system of claim 8, wherein the back-end profiler is located on a server machine in communication with the client machine.

10. The system of claim 9, wherein the client machine communicates with the server machine via a client API.

11. The system of claim 10, wherein the adapting includes translating the series of analysis steps using the client API.

12. The system of claim 8, wherein the back-end profiler is located in the virtual machine.

13. The system of claim 9, wherein the server further comprises a profiling database storing the output data.

14. The system of claim 8, wherein the back-end profiler is located on the client machine.

15. A non-transitory machine-readable storage medium comprising instructions, which when implemented by one or more machines, cause the one or more machines to perform operations for performing static code analysis on computer code, the operations comprising:
    creating, at a front-end profiler, a series of analysis steps to be performed on profiled data stored in memory;
    saving the series of analysis steps in memory as a report specification;
    causing a back-end profiler to perform profiling on the application, causing output of profiled data;
    receiving, at the front-end profiler, the profiled data from the back-end profiler;
    storing the profiled data as a model;
    adapting, at the front-end profiler, the model based on the series of analysis steps from the report specification;
    generating output data based on the adapted model; and
    displaying the output data to a user.

16. The non-transitory machine-readable storage medium of claim 15, wherein the adapting includes translating the series of analysis steps using a client application program interface (API) used to communicate with the back-end profiler.

17. The non-transitory machine-readable storage medium of claim 15, wherein the creating a series of analysis steps includes receiving input from a user via a command line interface and translating the input into analysis steps.

18. The non-transitory machine-readable storage medium of claim 15, wherein the creating a series of analysis steps includes receiving input from a user via a graphical user interface and translating the input into analysis steps.

19. The non-transitory machine-readable storage medium of claim 15, wherein the creating a series of analysis steps includes receiving an indication that user actions in a reporting tool should be recorded, recording the user actions in the reporting tool, and translating the user actions into analysis steps.

20. The non-transitory machine-readable storage medium of claim 15, wherein the creating a series of analysis steps includes deducing the analysis steps by monitoring user actions in a reporting tool and receiving feedback on the deductions from users or components.

* * * * *